United States Patent [19]

Bates

[11] 4,249,313
[45] Feb. 10, 1981

[54] PRUNING DEVICE

[76] Inventor: Richard G. H. Bates, 2638 N. 80th Pl., Scottsdale, Ariz. 85257

[21] Appl. No.: 67,341

[22] Filed: Aug. 17, 1979

[51] Int. Cl.³ .............................................. B27B 9/00
[52] U.S. Cl. ................................. 30/391; 30/DIG. 1
[58] Field of Search ................. 30/388, 382, 390, 391, 30/DIG. 1

[56] References Cited

U.S. PATENT DOCUMENTS

| | | | |
|---|---|---|---|
| 2,217,923 | 10/1940 | Silverman | 30/390 X |
| 2,342,052 | 2/1944 | Jimerson | 30/391 |
| 2,638,944 | 5/1953 | Woleslagle et al. | 30/382 X |
| 3,282,308 | 11/1966 | Sprague | 30/391 X |
| 3,373,489 | 3/1968 | Giles | 30/388 |
| 3,613,748 | 10/1971 | De Pue | 30/391 |
| 3,805,639 | 4/1974 | Peter | 30/391 |
| 3,922,785 | 12/1975 | Fushiya | 30/391 |
| 4,081,906 | 4/1978 | Sigler | 30/390 |

*Primary Examiner*—Jimmy C. Peters
*Attorney, Agent, or Firm*—Harry M. Weiss

[57] ABSTRACT

A hand held portable pruning tool having a housing enclosing a motor one or more batteries and a saw blade. The saw blade is rotatable about an axis perpendicular to the axis of the housing. The blade is normally protected by a telescoping guard element having a forwardly extending notch for receiving a stem or limb to be cut. The telescoping guard element retracts into the housing in response to pressure exerted on the guard element in the direction of the stem thus bring the stem into contact with the blade and also energizing the motor.

10 Claims, 3 Drawing Figures

PRUNING DEVICE

BACKGROUND OF THE INVENTION

1. Field of the Invention

This invention relates generally to hand held portable power tools and, more particularly, to a battery powered, motor driven tool for pruning plant limbs, stems and the like.

2. Description of the Prior Art

U.S. Pat. No. 3,373,489 illustrates a pruning device which includes a motor, a saw blade, and a trigger type switch. The saw blade, which rotates about an axis perpendicular to the axis of the tool, includes recesses integral with the teeth for driving engagement with a pinion rotated by the motor. A pair of forwardly extending arms direct the branch of a tree to the saw blade. This device suffers from the disadvantage that the blade is continuously exposed in the area between the arms creating the possibility of injury to the user. Furthermore, since the device is trigger actuated, energy may be wasted since the motor may be energized prior to contact of the blade with the limb and continue to be energized after the limb has been cut.

U.S. Pat. No 2,274,421 teaches a pruning device having a motor, a trigger type switch and a blade. Power from the motor to the blade, which also rotates about an axis perpendicular to the axis of the tool, is transmitted through a pair of bevel gears. A pair of shields encloses the forward portion of the blade such that as the device is pushed against a branch, limb or stem, the shields separate in opposite directions exposing the blade. While the safety of this device has been enhanced due to the shield, energy may still be wasted since the motor may be energized prior to contact with the branch or limb and remain energized after the branch has been cut.

Additional cutting devices are described in U.S. Pat. Nos. 2,342,052 and 3,282,308.

SUMMARY OF THE INVENTION

It is an object of the invention to provide an improved portable pruning device.

It is a further object of the invention to provide an improved pruning device wherein the blade is shielded to prevent injury to the user.

It is a still further object of the present invention to provide an improved pruning device wherein the blade is automatically energized by pressure imparted on a guard shield by the stem or limb to be pruned.

According to a broad aspect of the invention there is provided a portable pruning device for pruning stems, limbs and the like, comprising a housing; a saw blade mounted within said housing and extending outward therefrom; a guard shield telescopically mounted within said housing for shielding said saw blade until said guard shield is urged into said housing; and first means for automatically rotating said saw blade when said guard shield is urged into said housing.

The above and other objects, features and advantages of the present invention will be more clearly understood from the following detailed description taken in conjunction with the accompanying drawings, in which:

DESCRIPTION OF THE PREFERRED EMBODIMENT

Figure 1:
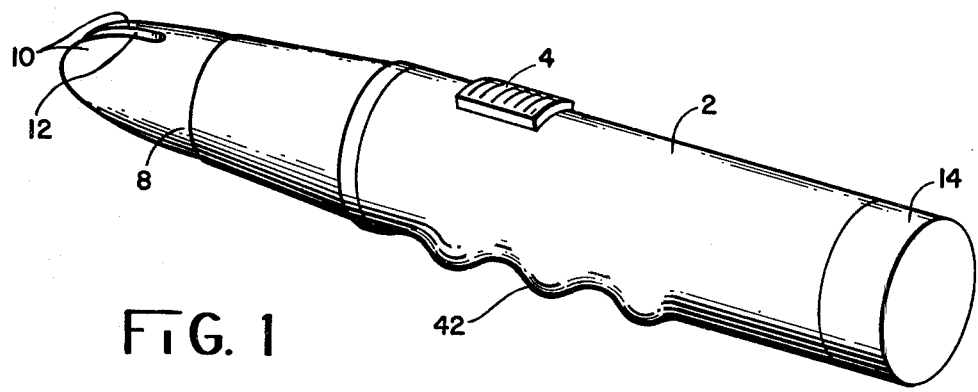
FIG. 1 illustrates the inventive pruning device.

FIG. 1 illustrates the inventive pruning device. A housing 2 houses a motor and batteries and has disposed thereon a manual switch 4 which when activated causes said motor to be energized. The housing also containes a blade assembly and a telescoping guard shield 8 having outwardly extending projections 10 for defining a slot 12 therebetween. The telescoping guard shield 8 will retract into the housing under pressure exerted by a stem or limb positioned in slot 12. A removable cap 14 is employed to provide access to the interior of the housing 2 in order to remove and replace batteries. Cap 14 may be threaded to engage corresponding threads in housing 2.

Figure 2:
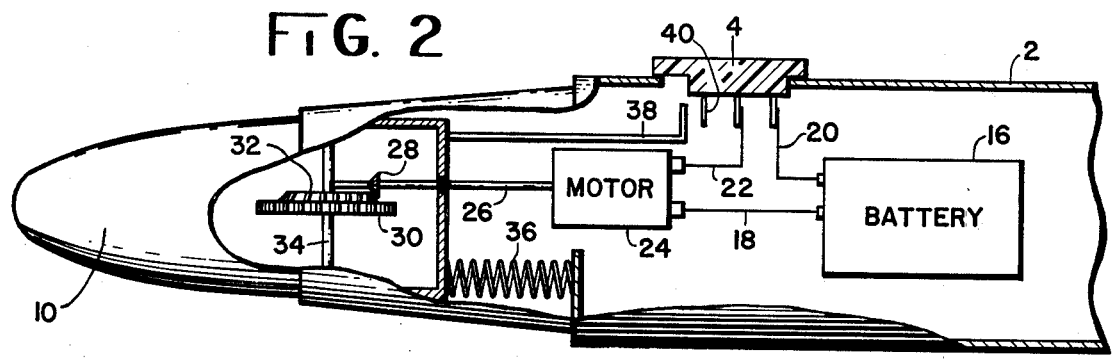
FIG. 2 illustrates the pruning device in a cut-away fashion to show its interior mechanisms.

Referring now to FIG. 2, the interior of the inventive pruning device is shown as comprising a battery 16, a motor 24, a motor shaft 26 connected to gear 28 and a saw blade 30 mounted on a shaft 34. Battery 16 is electrically coupled to motor 24 via conductor 18 and is coupled to switch 4 via conductor 20. Switch 4 is in turn coupled to a second terminal of motor 24 via conductor 22. Such switch and battery assemblies are well known and a further discussion is not deemed necessary. See, for example, U.S. Pat. Nos. 3,883,789, and 3,196,298. Motor shaft 26 is connected to gear 28 which engages teeth 32 on saw blade 30. As can be seen, saw blade 30 is mounted on a shaft 34 having an axis perpendicular to the axis of the pruning tool. Shaft 34 is coupled to hull housing 2.

Shield assembly 8 is urged outward over blade 30 by a spring 36 coupled between the shield assembly 8 and a portion of the housing 2. It can be seen that a linkage 38 extends from shield assembly 8 toward contact means 40 on switch 4.

Figure 3:
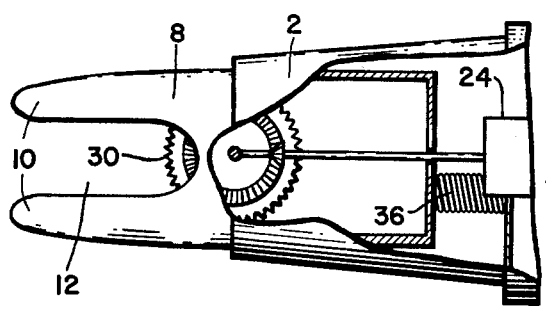
FIG. 3 illustrates the cutting portion of the pruning device of FIG. 2 with a telescoping guard element retracted to expose the blade.

The device operates as follows. The branch or stem to be pruned is positioned between arms 10. As the pruning device is urged towards the stem, guard shield assembly 8 retracts into housing 2 against the force of spring 36. When the guard shield assembly 8 has retracted sufficiently to cause linkage 38 to engage contact member 40, energy is delivered from the battery to the motor causing shaft 26 to rotate thus rotating blade 30 which is now exposed between arms 10. Of course, the motor and saw blade 30 may be actuated by manual movement of switch 4 if desired. FIG. 3 illustrates the forward portion of the hull and guard shield assembly with the saw blade 30 exposed between arms 10.

Finally, it can be seen that the housing assembly 2 is contoured such as is shown in 42 to provide comfortable gripping of the pruning device.

The above description of the preferred embodiment is given by way of example only. Changes in form and detail may be made therein by one skilled in the art without departing from the scope of the invention as defined by the appended claims. For example, the blade 30 can have a tapered cutting edge which would provide better cutting action than the substantially disc-shaped cutting edge shown in the figures. The terminating end portion of the rotating shaft 26 is rotatably coupled (such as by a surrounding bearing assembly (not shown) located in an opening in the stationary shaft 34) serves to prevent the gear 28 from being lifted relative to the saw blade 30 which rotates by means of bearings (not shown) about the stationary shaft 34.

I claim:

1. A portable pruning device for pruning stems, limbs and the like, comprising:

a housing;

a saw blade mounted within said housing and extending outward therefrom;

a guard shield telescopically mounted within said housing for shielding said saw blade until said guard shield is urged into said housing; and first means for automatically rotating said saw blade when said guard shield is urged into said housing.

2. A portable pruning device according to claim 1 wherein said first means comprises;

a switch;

a motor coupled to said saw blade;

second means coupled to said motor via said switch for energizing said motor when said switch is closed; and contact means coupled to said guard shield for automatically closing said switch when said guard shield is urged into said housing.

3. A portable pruning device according to claim 2 wherein said guard shield is resiliently biased to shield said saw blade.

4. A pruning device according to claim 3 wherein said guard shield has two outwardly extending arms defining a notch therebetween for receiving said stems, limbs and the like.

5. A pruning device according to claim 4 wherein said saw blade is mounted on a shaft mounted in said housing and having an axis substantially perpendicular to that of said pruning device.

6. A portable pruning device according to claim 5 wherein said motor is coupled to said saw blade by a gear assembly.

7. A portable pruning device according to claim 6 further including means mounted on the exterior of said housing for manually closing said switch.

8. A portable pruning device according to claim 7 wherein said second means includes at least one battery contained within said housing.

9. A portable pruning device according to claim 8 wherein said housing is contoured to facilitate gripping.

10. A portable pruning device according to claim 6 wherein said gear assembly comprises a gear wheel coupled to said motor and a plurality of teeth on said saw blade which are engaged by said gear wheel.

* * * * *